(12) United States Patent
Liu et al.

(10) Patent No.: US 9,338,082 B2
(45) Date of Patent: May 10, 2016

(54) RESILIENT BACKHAUL NETWORK

(71) Applicant: T-Mobile USA, Inc., Bellevue, WA (US)

(72) Inventors: Chunming Liu, Bellevue, WA (US); Bryan Fleming, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 373 days.

(21) Appl. No.: 13/728,493

(22) Filed: Dec. 27, 2012

(65) Prior Publication Data
US 2014/0185531 A1 Jul. 3, 2014

(51) Int. Cl.
*H04L 1/00* (2006.01)
*H04L 12/729* (2013.01)
*H04L 12/721* (2013.01)
*H04L 12/725* (2013.01)

(52) U.S. Cl.
CPC ............ *H04L 45/125* (2013.01); *H04L 45/302* (2013.01); *H04L 45/66* (2013.01)

(58) Field of Classification Search
CPC ............................ H04L 45/125; H04L 45/302
USPC ......................................................... 370/237
See application file for complete search history.

(56) References Cited

U.S. PATENT DOCUMENTS

| | | | | |
|---|---|---|---|---|
| 7,248,560 | B1 * | 7/2007 | Blankenship et al. | 370/220 |
| 8,332,251 | B1 * | 12/2012 | Morris et al. | 705/7.22 |
| 8,400,911 | B2 * | 3/2013 | Smith et al. | 370/225 |
| 2007/0142064 | A1 * | 6/2007 | Gutowski | 455/456.5 |
| 2008/0159212 | A1 * | 7/2008 | Zhang et al. | 370/329 |
| 2008/0219268 | A1 * | 9/2008 | Dennison | 370/395.2 |
| 2009/0003239 | A1 | 1/2009 | Campbell | |
| 2009/0116393 | A1 * | 5/2009 | Hughes et al. | 370/238 |
| 2011/0058479 | A1 | 3/2011 | Chowdhury | |
| 2011/0170860 | A1 * | 7/2011 | Smith et al. | 398/25 |
| 2012/0057473 | A1 * | 3/2012 | Nguyen et al. | 370/245 |
| 2012/0058777 | A1 * | 3/2012 | Nguyen et al. | 455/456.1 |
| 2013/0012251 | A1 * | 1/2013 | Roddy et al. | 455/509 |
| 2013/0094374 | A1 * | 4/2013 | Zhou et al. | 370/252 |
| 2013/0166623 | A1 * | 6/2013 | Stanwood et al. | 709/202 |
| 2014/0022945 | A1 * | 1/2014 | Verchere et al. | 370/254 |
| 2014/0029521 | A1 * | 1/2014 | Puthenpura et al. | 370/329 |
| 2014/0160939 | A1 * | 6/2014 | Arad et al. | 370/237 |
| 2014/0192677 | A1 * | 7/2014 | Chew et al. | 370/254 |

FOREIGN PATENT DOCUMENTS

| | | |
|---|---|---|
| WO | WO2012044148 | 4/2012 |
| WO | WO2012105881 | 8/2012 |
| WO | WO2012120510 | 9/2012 |
| WO | WO 2013117242 A1 * | 8/2013 |

OTHER PUBLICATIONS

The PCT Search Report and Written Opinion mailed Mar. 11, 2014 for PCT application No. PCT/US13/71689, 11 pages.

* cited by examiner

*Primary Examiner* — Shaq Taha
(74) *Attorney, Agent, or Firm* — Lee & Hayes, PLLC

(57) ABSTRACT

A provider equipment having a backhaul resiliency module operable to determine multiple, alternative communication paths in a backhaul portion of a telecommunication network and then compare the different, alternative communication paths, based on their respective backhaul component reuse, to identify one or more resilient communication paths as options for a particular backhaul communication. The provider equipment can then select a preferred resilient communication path for either an uplink or a downlink of the backhaul network. Each of the alternative communication paths can correspond to a unique combination of Carrier Ethernet nodes and links that connect pairs of provider equipment devices located on opposing sides of a Carrier Ethernet, such as on a RAN side, an MSO side, or another Network side of the telecommunication network).

14 Claims, 12 Drawing Sheets

RESILIENT BACKHAUL NETWORK

BACKGROUND

Modern telecommunication systems include heterogeneous mixtures of second, third, and fourth generation (2G, 3G, and 4G) cellular access technologies, which are cross-compatible and operate collectively to provide broadband communication services to a majority of the population in the United States, as well as to populations abroad. Global Systems for Mobile (GSM) is an example of 2G wireless telecommunication technologies; Universal Mobile Telecommunication System (UMTS) is an example of 3G wireless telecommunication technologies; and Long Term Evolution (LTE), including LTE Advanced and Evolved High-Speed Packet Access (HSPA+), are examples of 4G wireless telecommunication technologies.

With the advent of many popular web-based content providers (e.g., Facebook®, Twitter®, Netflix®, Hulu®, YouTube®, Pandora®, iTunes®, Google Play®, Amazon Store®, and the like), cutting-edge communication devices (e.g., smart phones, tablet computers, electronic book devices, etc.), and enhanced cellular-wireless access technologies (e.g., LTE, LTE advanced, and HSPA+), modern telecommunication networks are supporting an increasing amount of internet protocol (IP) data being communicated over the radio access network (RAN) portion of their respective network (e.g., over the Universal Terrestrial Radio Access Network (UTRAN) of UMTS as well as over the Evolved Universal Terrestrial Radio Access Network (E-UTRAN) of LTE). As the RAN portion of modern telecommunication networks continues to evolve, so must the backhaul portion of these networks. Network-service-provider-side enhancements and renovations are necessary for service providers to be able to accommodate the exponential increase of IP-based traffic over modern telecommunication networks.

The Metro Ethernet Forum (MEF) is an international industry consortium dedicated to promoting the adoption of Carrier Ethernet. The MEF is responsible for the standardization of evolving Carrier Ethernet communication technologies, which it accomplishes by publishing various related technical specifications associated with modern backhaul networks. With respect to the 4G LTE communication protocol suite, the MEF has provided at least the following Carrier Ethernet specifications and definitions, which describe various technologies that are intended to support high-throughput 4G backhaul communications:

MEF 22.1: Mobile Backhaul Phase 2 Implementation Agreement

MEF 23.1: Class of Service Phase 2 Implementation Agreement

MEF 6.1: Metro Ethernet Services Definitions Phase 2

MEF 6.1.1: Layer 2 Control Protocol Handling Amend. to MEF 6.1

MEF 10.2: MEF 10.2 Ethernet Services Attributes Phase 2

MEF 10.2.1: Performance Attributes Amend. to MEF 10.2

In addition, Carrier Ethernet service providers and their customers/licensees (e.g., cellular-wireless access providers) are actively pursuing new ways to improve the availability and quality of service (QoS) of their respective backhaul networks. Unfortunately, modern Carrier Ethernet network providers generally fail to dynamically adapt to time-varying network conditions so as to allow a corresponding Carrier Ethernet network to sufficiently withstand inevitable backhaul component failures (e.g., a damaged or a defective router device, or an unavailable or over-burdened communication link).

BRIEF DESCRIPTION OF THE DRAWINGS

The Detailed Description is set forth with reference to the accompanying figures.

DETAILED DESCRIPTION

Backhaul telecommunication networks, also referred to herein as Carrier Ethernet networks, are presently being revamped to accommodate an alarming increase in the amount of internet protocol (IP) data being transferred within modern telecommunication networks. This rapid influx of IP data to modern backhaul networks has been precipitated by the evolution of high-throughput 4G LTE and HSPA+ communication technologies, along with the emergence of popular mobile computing devices, including smart phones, tablet computing devices, electronic book devices, personal media players, etc. Further, Many popular web-based content providers are increasingly inpouring streaming media content into the backhaul portion of a telecommunication network (i.e., on the downlink), thereby burdening provider equipment (PE) at the periphery of the backhaul, by requiring these network devices to route, assign, and reassign communication paths (also referred to as pipes) for voluminous, extended-duration communication sessions.

Figure 1:
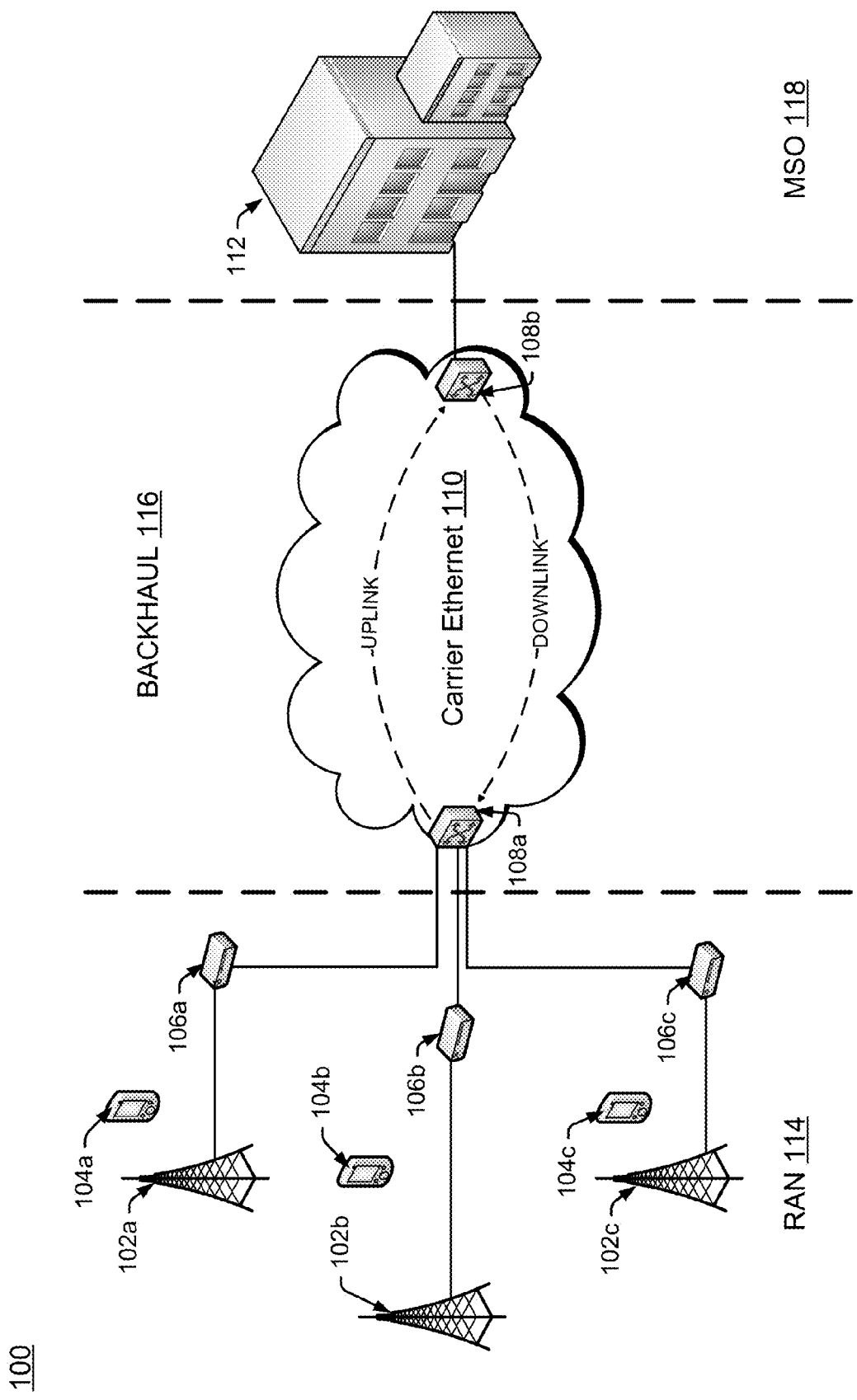
FIG. 1 is a network diagram depicting different segments of a modern telecommunication network, in association with embodiments of the disclosure.

FIG. 1 is a high-level, telecommunication network diagram 100 depicting the different segments of a modern cellular communication network. In various implementations, the radio access network (RAN) portion 114 of the telecommunication network may include a plurality of network cells respectively associated with any number of network base stations 102a-c servicing multiple user devices 104a-c (e.g., combinations of smart phones, tablet computer, electronic book devices, etc.) within their respective radio coverage areas, as well as any combination of common provider control, routing, and/or gateway devices 106a-c. In one embodiment, the RAN 114 may correspond to a Universal Terrestrial Radio Access Network (UTRAN) of the 3G Universal Mobile Telecommunication System (UMTS), where the base stations 102a-c represent NodeBs, and one or more of RAN devices 106a-c represent a Radio Network Controller (RNC). In another implementation, the RAN 114 may correspond to an Enhanced Universal Terrestrial Radio Access Network (E-UTRAN) of 4G Long Term Evolution (LTE) or LTE Advanced, where the base stations 102a-c represent Enhanced NodeBs (E-NodeBs) that can provide various control functionality similar to that provided by a 3G UMTS RNC.

In various implementations, the backhaul portion 116 of the telecommunication network of FIG. 1 may include a Carrier Ethernet network 110, at the periphery of which there may be multiple provider equipment (PE) devices 108a-b that can facilitate both uplink and downlink backhaul communications via any combination of common wireline (e.g., via fiber-optic lines, copper cables, etc.) and/or wireless (e.g., via fixed WiMax) communication technologies that are present within the Carrier Ethernet network 110. In an implementation, the PE device 108a on the RAN 114 side of the backhaul 116 can facilitate uplink communications between the RAN 114 and an Mobile Service Operator (MSO) 118 via the Carrier Ethernet 110, whereas the PE device 108b on the MSO 118 side of the backhaul 116 can facilitate downlink communications between a service provider entity 112 (e.g., a cellular-wireless service provider) and the RAN 114 via the Carrier Ethernet network 110.

In various implementations, the PE devices 108a-b of the backhaul 116 may correspond to Carrier Ethernet demarcation points, as defined by the MEF, and corresponding to a User-to-Network Interface (UNI) device and/or a Network-to-Network Interface (NNI) device. As would be appreciated by those skilled in the art, a UNI device 108a-b may act as a demarcation point between a service provider and a subscriber or as a starting point/ending point for an Carrier Ethernet network 110, whereas an NNI may act as a demarcation point between two different network operators (not shown).

Further, it should be understood that an Ethernet Virtual Connection (EVC) can correspond to an Ethernet service that is facilitated by a Carrier Ethernet network 110 path/pipe connecting two or more UNI devices 108a-b at network demarcation points.

It should also be understood that Carrier Ethernet demarcation points (e.g., UNIs, NNIs, and EVCs) are important network locations/devices for providing Carrier Ethernet network 110 services as they can allow for telecommunication service providers to extend management and control of their serviced communications over an entire service path, starting from network cross-over points, such as between the RAN 114 and the backhaul 116, or between the backhaul 116 and the MSO 118. Further, Carrier Ethernet demarcation devices are required to support various Ethernet services, such as EPL (Ethernet Private Line), EVPL (Ethernet Virtual Private Line), E-LAN (Ethernet LAN), and E-Tree (Ethernet Tree), as specified by the MEF.

The present disclosure describes various network resiliency solutions for implementation within the backhaul 116 portion of a telecommunication network (e.g., within a Carrier Ethernet network 110). In an exemplary embodiment, an EVC resiliency solution can be employed by one or more PEs 106a-b (e.g., via a pair of UNI devices) that are configured to interface with each other by communicating over select portions of a Carrier Ethernet network 110. In various implementations, an EVC resiliency scheme may be operable to identify a number of minimally-correlated Virtual Local Area Network (VLAN) paths/pipes over the same portion of a backhaul network 116 that may be associated with a particular network cell site (e.g., including one or more network base stations 102a-c). The identified VLAN paths can be initially identified, and optionally ranked, in accordance their overall path length (e.g., by employing any common shortest-path algorithm, such as Dijkstra's shortest-path algorithm), and employed path communication technologies.

Subsequent to the identification, one or more designated shortest paths can be analyzed and/or compared to determine which of this subset of VLAN paths is least or minimally correlated to the other identified shortest paths, based on various Carrier Ethernet component reuse considerations (e.g., reuse of EVC node and link components amongst the different, identified shortest paths). In this way, at least one identified, optimal EVC or VLAN path can be assigned for a backhaul communication to provide the best available combination of path throughput, quality of service (QoS), and network resiliency (in terms of an assigned EVC path being resistant to potential backhaul disruptions or failures). Accordingly, a resilient EVC path assignment process can be employed to provide for improved end-to-end Carrier Ethernet 110 network availability, without incurring expensive network upgrade costs, which are typically associated with network redundancy solutions where expensive hardware is added to a telecommunication network.

In an embodiment, network availability may be defined in terms of the following equation:

$$A = \frac{MTBF}{MTBF + MTTR} \quad \text{(Eq. 1)}$$

where, A=Availability;
MTBF=mean time between failures; and
MTTR=mean time to repair In accordance with Eq. 1, recited above, for a destination cell site (e.g., any of network base stations 102a-c) of the RAN 114, average end-to-end network availability can be determined by multiplying the average availabilities of each path component between a RAN 114 cell site and the MSO 118 core network, in series.

In various implementations, PE devices 108a-b (e.g., UNI or NNI devices) can be configured to communicate with each other to monitor network performance levels and current network state information at their respective demarcation points within a telecommunication network. In one implementation, a pair of UNI devices 108a-b may be configured to continually or periodically monitor one or more of: network availability, network throughput, network congestion, jitter levels, packet delay, frame loss ratios, etc. By way of example, in another implementation, a UNI device and a NNI device can collaborate with each other to perform a variety network tests (e.g., via a two-way active measurement protocol (TW-AMP)), to determine any of the network performance metrics, relating to availability, throughput, congestion, jitter, packet delay, frame loss, etc. In various embodiments, corresponding Ethernet OAM test results can be reported as key performance indicators (KPIs) to facilitate any of the Carrier Ethernet performance estimations that are described further herein.

Figure 2:
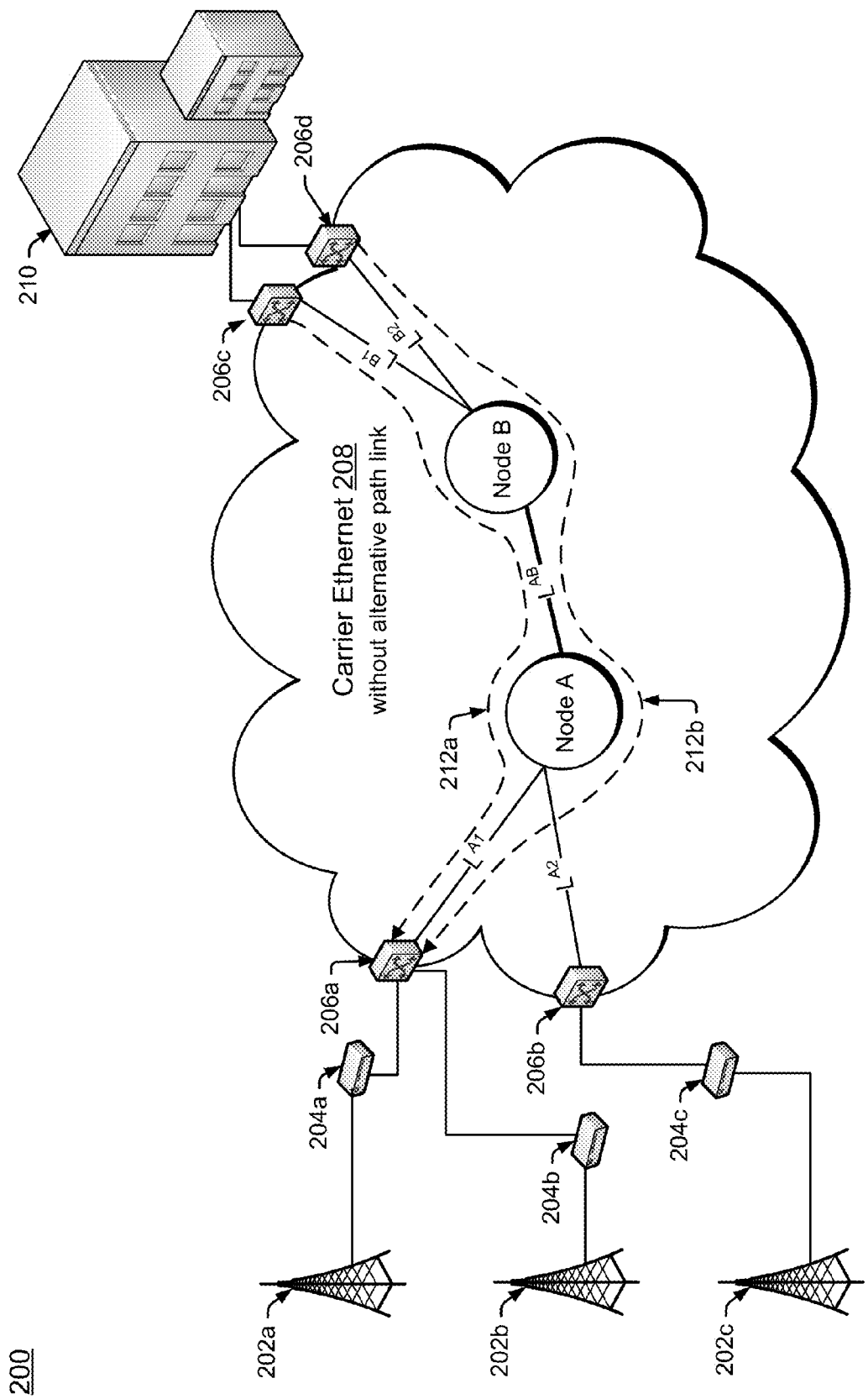
FIG. 2 is a network diagram depicting a Carrier Ethernet portion of a telecommunication network, which does not have an alternative path link for a backhaul communication, in association with embodiments of the disclosure.

FIG. 2 depicts a telecommunication network 200 having a Carrier Ethernet portion 208, which does not provide for an alternative path link for every segment of a backhaul communication. Similar to that which was described above with respect to FIG. 1, the RAN portion of telecommunication network 200 of FIG. 2 may include, but is not limited to, multiple network base stations 202a-c, as well as any combination of common provider control, routing, and/or gateway devices 204a-c. In an embodiment, a telecommunication service provider entity 210 can be configured to transfer data over a Carrier Ethernet 208 portion of the backhaul (e.g., on the downlink), using one of two different non-fault tolerant EVC paths, 212a or 212b, which share a common path link $L^{AB}$, connecting Node A and Node B. Path link $L^{AB}$, as well as either of Nodes A and B, may be independently viewed as a single point-of-failure that is common to each alternate EVC path, 212a and 212b.

In an implementation, a downlink communication may be transmitted via the service provider entity 210 over a first EVC path 212a, starting from a source PE 206c, continuing along link $L^{B1}$, through Node B, further along link $L^{AB}$, through Node A, and then along link $L^{A1}$, to a destination PE 206a, which is on the RAN side of the Carrier Ethernet network 208. Another downlink communication may be transmitted via the service provider entity 210 over a second EVC path 212b, starting from a source PE 206d, continuing along link $L^{B2}$, through Node B, further along link $L^{AB}$, through Node A, and then along link $L^{A1}$, to the same destination PE 206a. In this backhaul network topology, when any one of link $L^{AB}$, Node A, or Node B, fails there is no alternative path link available to facilitate communications between respective source and destination PEs: from PE 206c→PE 206a or from PE 206d→PE 206b. Accordingly, the Carrier Ethernet portion 208 of the telecommunication network 200 does not provide for adequate network resiliency, in detrimental scenarios that include backhaul component failures and/or unexpected network faults.

Figure 3:
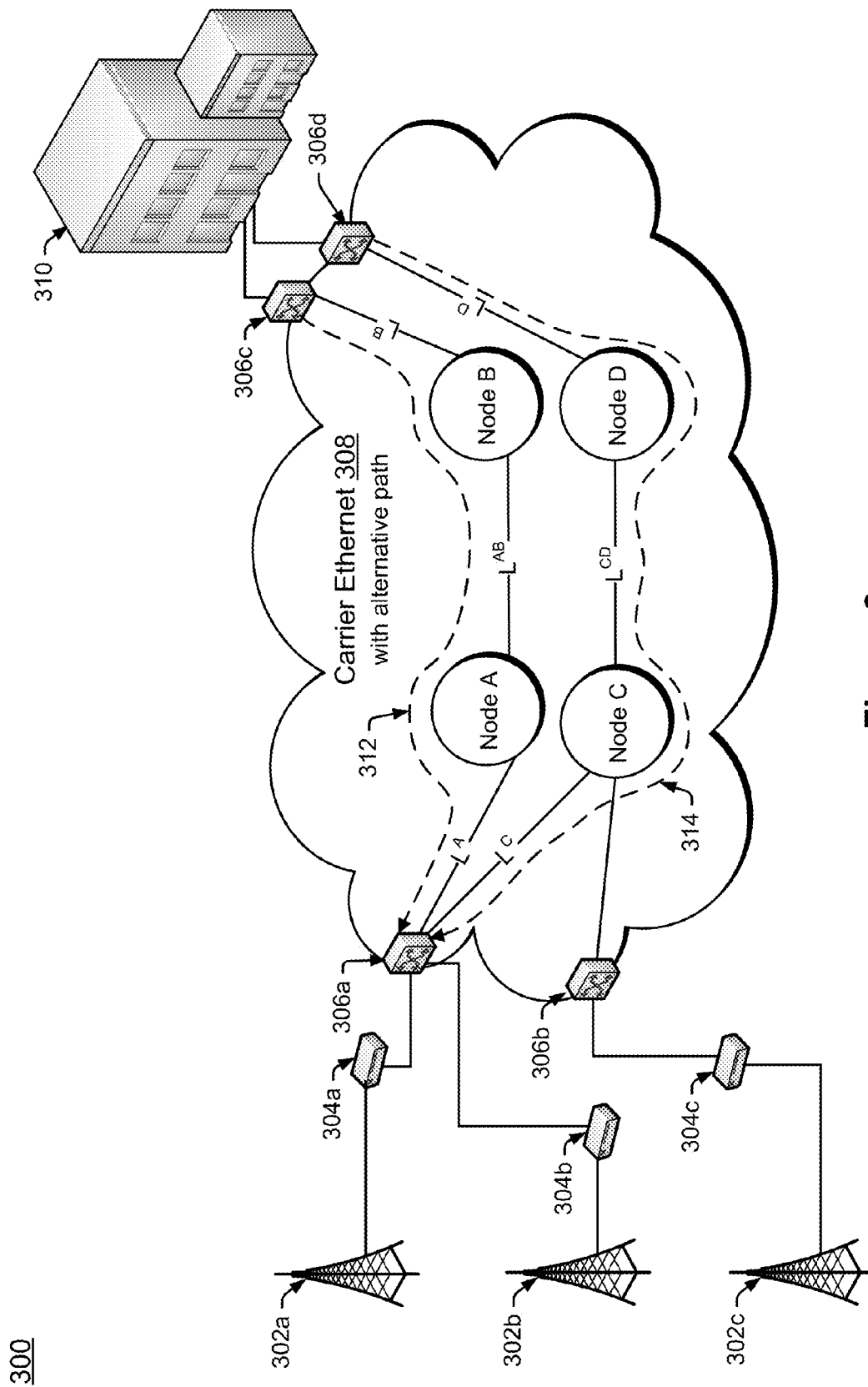
FIG. 3 is a network diagram depicting a Carrier Ethernet portion of a telecommunication network having an alternative path for a backhaul communication, in association with embodiments of the disclosure.

In contrast with the Carrier Ethernet network 208 described above for FIG. 2, the Carrier Ethernet portion 308 of the telecommunication network 300 of FIG. 3 does provide alternative EVC pipes, 312 and 314, comprising independent path segments (path segments that are not shared) for enabling resilient backhaul communication. In an embodiment, the RAN portion of the telecommunication network 300 of FIG. 3 may include, but is not limited to, multiple network base stations 302a-c, as well as any combination of common provider control, routing, and/or gateway devices 304a-c. In one implementation, a telecommunication service provider 310 may be configured to transfer data over a Carrier Ethernet 308 portion of the backhaul (on the downlink), using either of two distinct EVC paths, 312 or 314, which do not share a single common EVC link or EVC node. In this regard, there is no single point-of-failure, in either of the resilient EVC paths, 312 and 314.

In an embodiment, a downlink communication may be transmitted via the service provider entity 310 over a first EVC path 312, starting from a source PE 306c, continuing along link $L^B$, through Node B, further along link $L^{AB}$, through Node A, and then along link $L^A$, to a destination PE 306a, which is on the RAN side of the Carrier Ethernet network 308. Another downlink communication may further be transmitted via the service provider entity 310 over a second EVC path 314, starting from a source PE 306d, continuing along link $L^D$, through Node D, further along link $L^{CD}$, through Node C, and then along link $L^C$, to the same destination PE 306a. In this fault-tolerant Carrier Ethernet network 308 topology, when any one of links $L^A$, $L^B$, $L^C$, $L^D$, $L^{AB}$, or $L^{CD}$ fail, or when any one of Node A, Node B, Node C or Node D fail, an alternative path is still available to facilitate communications between respective source and destination PEs, such as from PE 306c→PE 306a or from PE 306d→PE 306a. Accordingly, the Carrier Ethernet 308 portion of the telecommunication network 300 provides network resiliency, in scenarios including backhaul component failures or an unanticipated network faults.

Figure 4:
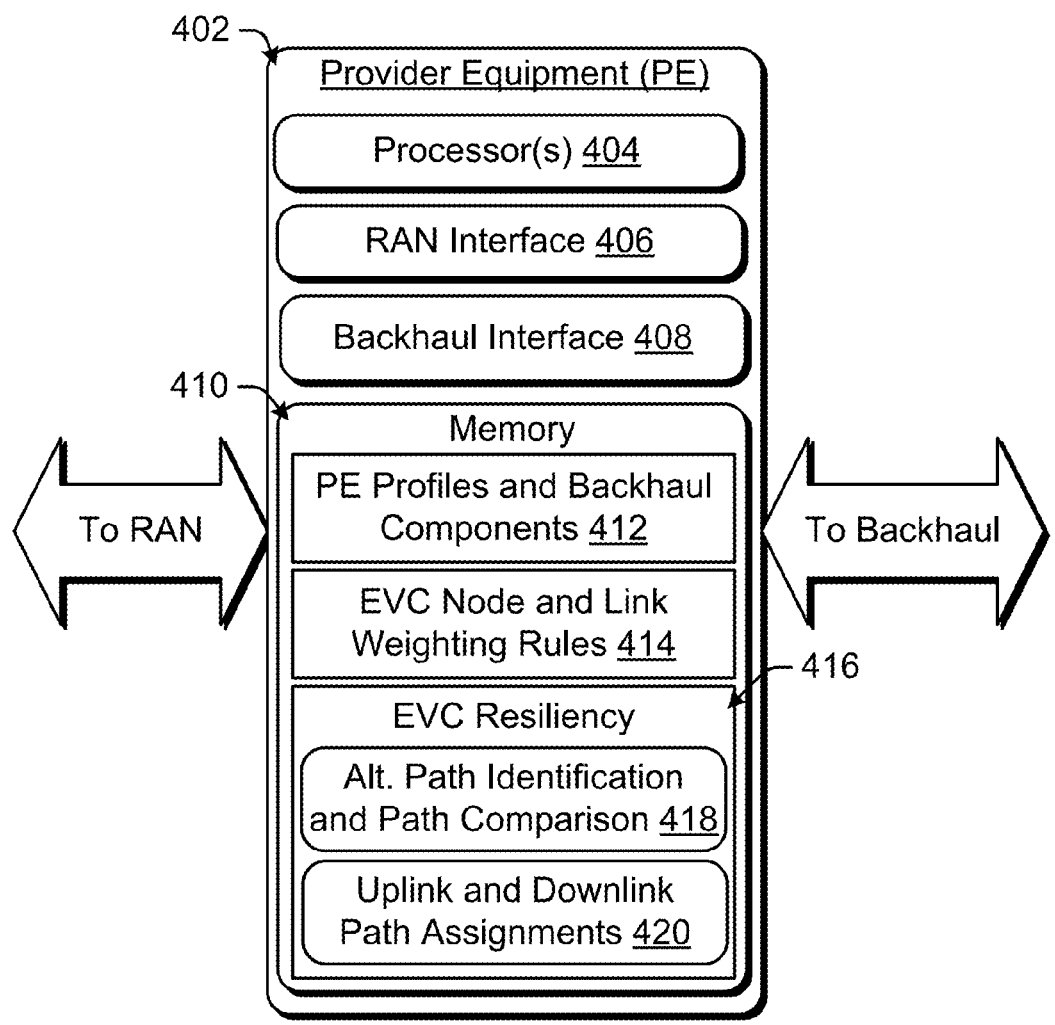
FIG. 4 is an example hardware platform employed in a provider equipment (PE) for implementing an Ethernet Virtual Connection (EVC) resiliency process, in association with embodiments of the disclosure.
Figure 11:
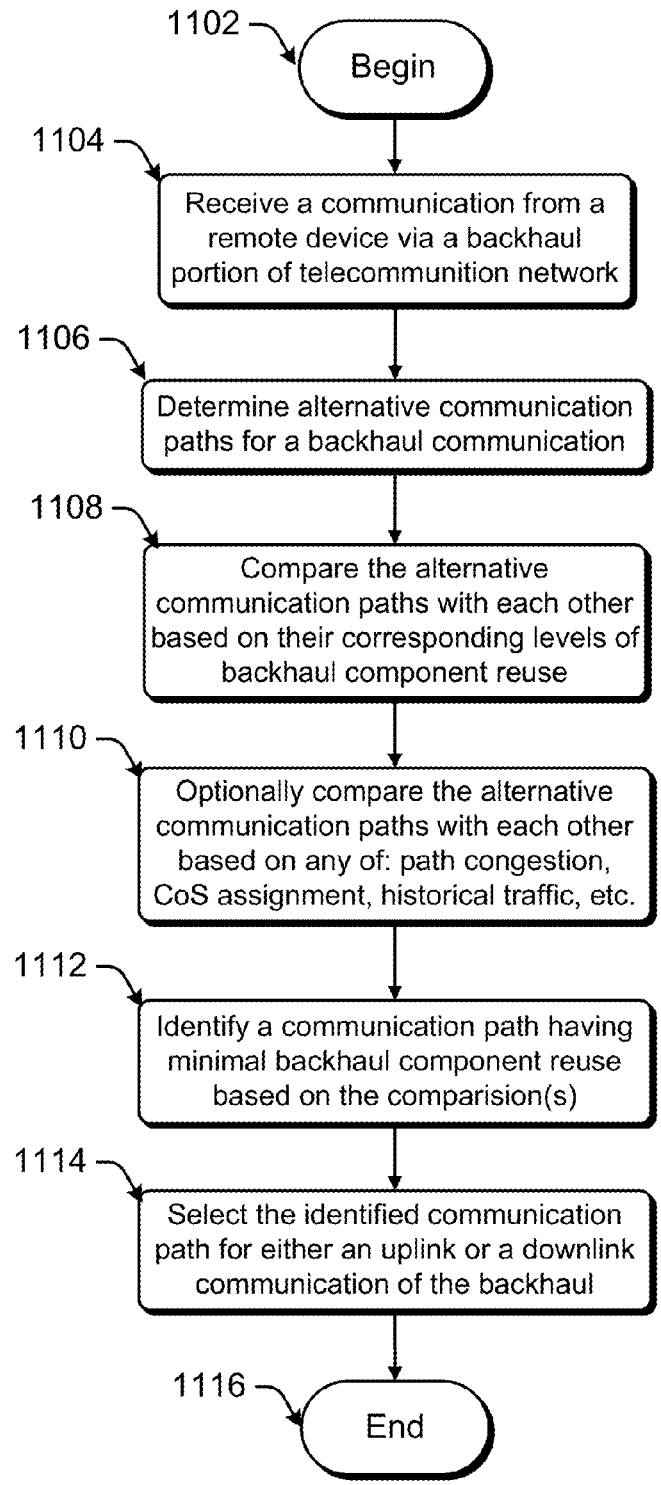
FIG. 11 is a flow diagram depicting an example process for comparing alternative communication paths for a communication over the backhaul portion of a telecommunication network, based on levels of backhaul component reuse, in association with embodiments of the disclosure.
Figure 12:
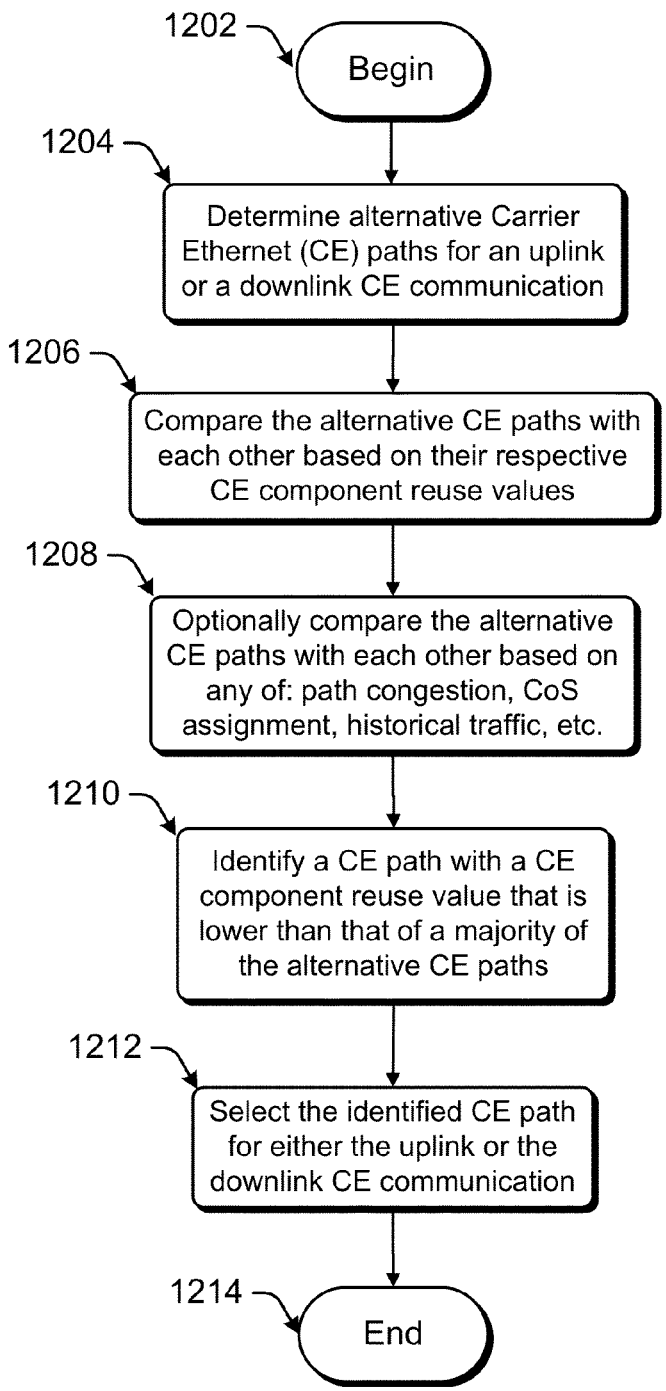
FIG. 12 is a flow diagram depicting an example process for comparing alternative Carrier Ethernet (CE) paths for an uplink or a downlink communication, based on CE path component reuse values, in association with embodiments of the disclosure.

FIG. 4 depicts an example hardware platform employed in a provider equipment (PE) 402 that may be configured to implement various EVC resiliency processes described in the present disclosure, including those associated with any of the flow diagram processes 1000, 1100, 1200, described further herein with respect to FIGS. 11-12. It should be understood that the PE 402 may be representative of any common type of service provider device (e.g., a UNI or a NNI device) which can be located at a point of demarcation between different portions of a telecommunication network comprising a Carrier Ethernet backhaul, a RAN, a MSO, a 3G core network, etc. In various implementations, the PE 402 may be configured to communication over the RAN 114 and backhaul 116 portions of a telecommunication network 100, by employing any common wireline communication technology, including, but not limited to, optical fiber, coaxial cable, twisted pair cable, Ethernet cable, or the like, as well as any common wireless communication technology, including fixed WiMax which can be employed in a wireless (microwave) portion backhaul.

In various implementations, the PE 402 may include, but is not limited to, one or more processor(s) 404, a RAN interface 406 for communicating with the RAN 114 portion of a telecommunication network, a backhaul interface 408 for communicating with the backhaul 116 portion of a telecommunication network, and a memory 410 including: a PE profiles and backhaul component storage 412, an EVC node and link weighting rules 414, as well as an EVC resiliency component 416 having an alternative path identification and comparison module 418 and an uplink/downlink path assignments module 420. Although not explicitly depicted in FIG. 4, each of the one or more processor(s) 404, can include any number of central processing units (CPUs) comprising multiple arithmetic logic units (ALUs) that are configured to perform arithmetic and logical operations, along with one or more control units (CUs) that are configured to extract instructions and stored content from cache-level memory, and then execute the extracted instructions by calling on the ALUs during program execution.

In various implementations, the one or more processor(s) 404 may be operable to execute the EVC resiliency component 416 stored in the PE's 402 memory 410, which can be associated with any common type of volatile memory, such as a random access memory (RAM), and/or any common type of non-volatile memory, such as a read-only memory (ROM). In various embodiments, the processor(s) 404 may further be operable to execute the EVC resiliency module 416 in the memory 410 to perform any portion of the flow diagram processes 1000, 1100, 1200, described further herein with respect to FIGS. 11-12. In an implementation, the PE profiles in the backhaul component storage area 412 can be configured to store provider equipment profiles for PEs (e.g., routers or gateways, including UNI and NNI devices) associated with a particular telecommunication service provider, along with profiles (VLAN component IDs) for devices (e.g., backhaul components, including EVC nodes/routers) of various Carrier Ethernet service providers of a backhaul. In another implementation, the EVC node and link weighting rules storage area 414 can be configured to store sets rules for assigning path penalty weights to both EVC nodes and EVC links for a particular Carrier Ethernet network 110, based on different combinations of network performance metrics.

In an embodiment, the alternative path identification and comparison module 418 of the EVC resiliency component 416, may be configured to identify a set of shortest, alternate EVC paths between a pair of PEs located at opposing sides of a network backhaul (e.g., where one PE is located on the RAN side of the backhaul and the other PE is located the MSO side of the backhaul). In various implementations, the alternative, shortest paths may be determined by consulting backhaul node and link profile information stored in the PE profiles and backhaul component storage 412 of the PE's 402 memory 416. The EVC resiliency component 416 may also be configured to use the alternative path identification and path comparison module 418 to determine which EVC nodes and links exist along each respective alternative EVC path between a given pair of backhaul PEs. In an embodiment, the EVC resiliency component 416 may also be configured to determine EVC link distances from the stored network information 412, to rank alternative EVCs in accordance with their respective path lengths.

In another implementation, the alternative path identification and comparison module 418 of the EVC resiliency component 416 may be configured to compare alternative, shortest EVC paths between a pair of backhaul PEs, based on their respective cumulative EVC path penalty weights. The assignment of EVC path penalty weights is described further herein with respect to FIGS. 6-9. However, it should be understood that each of the alternative, shortest paths may be assigned a cumulative EVC/path component reuse value and/or an EVC/path component reuse level corresponding to a predetermined range of reuse values to which the cumulative EVC/path component reuse value belongs, i.e., low, medium, and high reuse levels. In an embodiment, the cumulative EVC/path component reuse value for a shortest path can be calculated by summing the path penalty weights assigned to each EVC component (e.g., summing weights for each EVC node and link) along a given path. The alternative, shortest paths' respective cumulative EVC/path component reuse values may also be compared with each other to determine which of the alternative, shortest paths have the lowest component reuse value(s) (e.g., in comparison to the rest of the available paths), and which of the alternative shortest paths corresponds to one or more predetermined quality of service (QoS) level(s).

In various implementations, a predetermined QoS level to which alternative, shortest paths may be compared can correspond to, but is not limited to, any of the following network metrics: path throughput, path congestion, CoS assignment (e.g., corresponding to time-delay data type sensitivities), etc. It should be noted that in some embodiments more than one identified alternative, shortest path can be assigned for a single uplink or downlink communication over the Carrier Ethernet portion of a backhaul. By way of example, if an extended duration, time-delay sensitive downlink communication (e.g., streaming video) were being scheduled for transfer over the backhaul and multiple, high-throughput VLAN paths were available to facilitate the transfer; the corresponding data transfer may be split between or amongst the multiple paths to distribute the communication load. Further, a path assignment may also be selected based on a combination of a level of path resiliency and a level of path throughput. For instance, amongst a ranked (based on cumulative EVC reuse weights) group of available VLAN paths, an alternative VLAN path having lesser path resiliency (a lower path reuse value) may be selected for the data transfer if this path were determined to have significantly better throughput at a given point in time during an anticipated data transfer session. In essence, it may be beneficial to sacrifice some resiliency for improved throughput for certain communications.

In various embodiments, the cumulative EVC path component reuse values assigned to individual alternative, shortest paths can also be continually or periodically updated (e.g., at the PE, or pair of PEs, responsible for making one or more path assignments) to accommodate/account for changing network performance and network state information which can be associated with one or more of: network availability, network throughput, network congestion, jitter level, delay time, frame loss ratios, etc. As such, comparisons yielding cumulative EVC path component reuse value rankings for the alternative, shortest paths may be updated by reassigning updated EVC component path penalty weights to each EVC component of a respective alternative, shortest path, and then repeating the comparison procedures to continually yield new cumulative EVC path reuse value rankings. In this manner, a service provider can ensure that various uplink or downlink backhaul communications are being assigned to EVC paths that currently provide an optimal combination of QoS and path resiliency.

In various implementations, the alternative path identification and comparison module 418 of the EVC resiliency component 416 may be further configured to compare alternative, shortest EVC paths between a pair of backhaul PEs, based on any one of: path throughput, path availability, path congestion, cumulative path QoS levels, CoS assignment, historical traffic trends, EVC component failure and/or fault information, etc. As would be understood by those skilled in the art, this supplemental information could be useful to further refine EVC component reuse rankings and corresponding EVC path selection processes. By way of example, if a downlink communication over a Carrier Ethernet portion of a telecommunication network were associated with a particular CoS for a nonvolatile data type (e.g., a CoS for static web content that was not sensitive to time delay), an alternative EVC path may be selected to improve path resiliency, while intentionally compromising a level of communication throughput. In an implementation, this outcome may be accomplished by choosing to select an EVC path having the lowest cumulative EVC path reuse value, even when alternative EVC paths that are more capable of accommodating higher throughput communications are available.

In another embodiment, the uplink/downlink path assignments module 420 of the EVC resiliency component 416 may be configured to consult an updated list of cumulative EVC path component reuse value rankings, having been derived from any of the above comparisons described above with respect to the alternative path identification and comparison module 418 to determine how best to assign ranked EVC paths to various uplink and downlink communications of the backhaul. In another implementation, the uplink/downlink path assignments module 420 may also be configured to make various path assignment decisions, based on one or more of: path throughput, path congestion, path availability, cumulative path QoS, CoS assignment, historical traffic trends, EVC component failure and/or fault information, etc.

Figure 5:
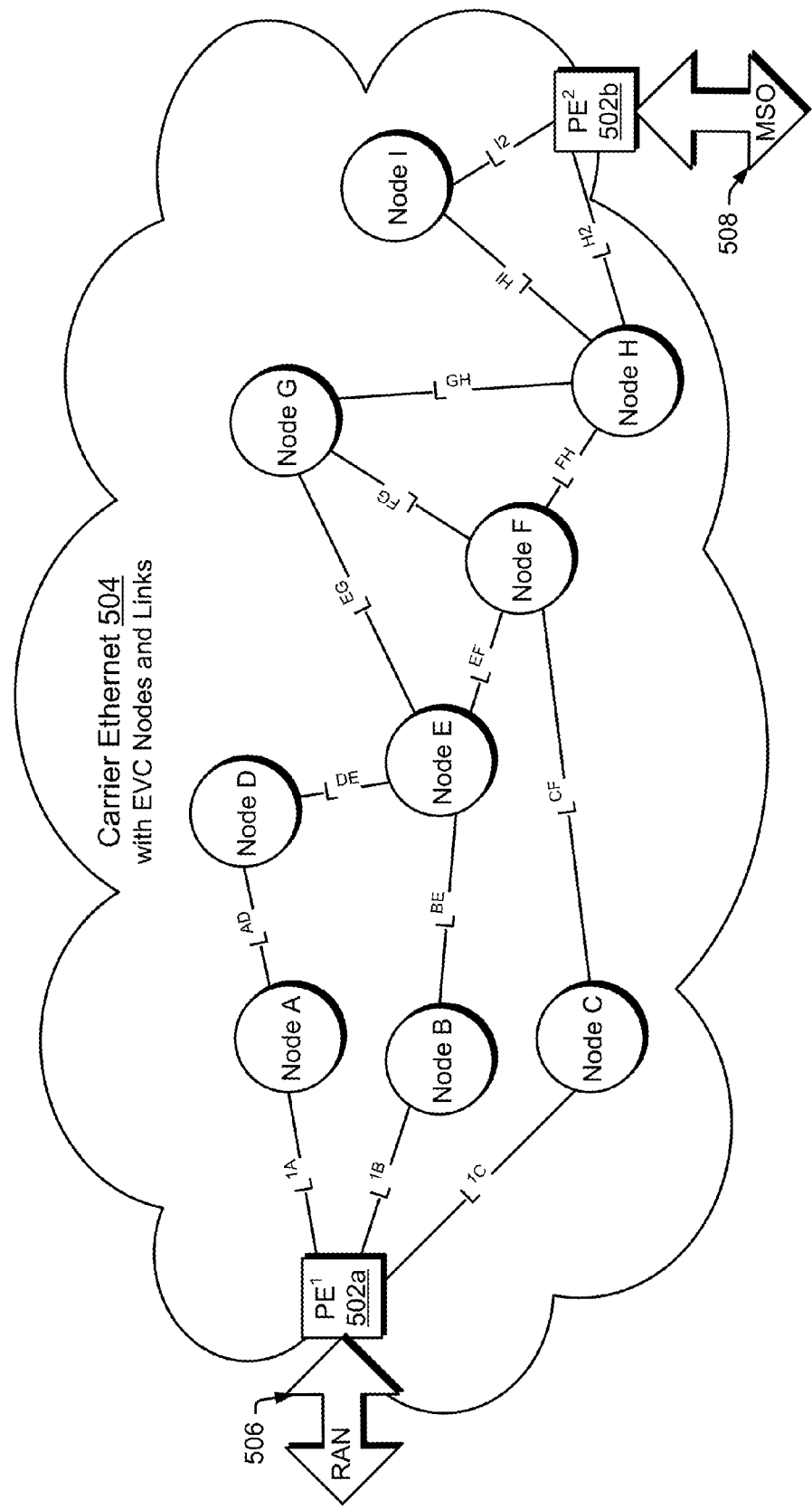
FIG. 5 is a network diagram depicting a Carrier Ethernet network topology comprising a specific arrangement of network backhaul nodes and communication links, in association with embodiments of the disclosure.

FIG. 5 depicts a diagram 500 including a Carrier Ethernet network 504 that is capable of communicating with the RAN 506 portion of a telecommunication network via a first $PE^1$ 502a, as well as with the MSO 508 portion of a telecommunication network via a second $PE^2$ 502b. The Carrier Ethernet network 504 can include a variety of EVC nodes and communication links, which are connected in such a way as to provide multiple, alternative EVC paths between $PE^1$ 502a and $PE^2$ 502b. It should be understood that each of the EVC links: $L^{1A}$, $L^{1B}$, $L^{1C}$, $L^{AD}$, $L^{BE}$, $L^{CF}$, $L^{DE}$, $L^{EG}$, $L^{EF}$, $L^{FG}$, $L^{FH}$, $L^{GH}$, $L^{HI}$, $L^{H2}$, and $L^{I2}$, as well as each of the EVC nodes: Node A, Node B, Node C, Node D, Node E, Node F, Node G, Node H, and Node I, depicted in the Carrier Ethernet network 504 of FIG. 5, may also correspond to the EVC nodes and links depicted in each of FIGS. 7-9, during different stages of an EVC resiliency process associated with various implementations of the disclosure.

Figure 6:
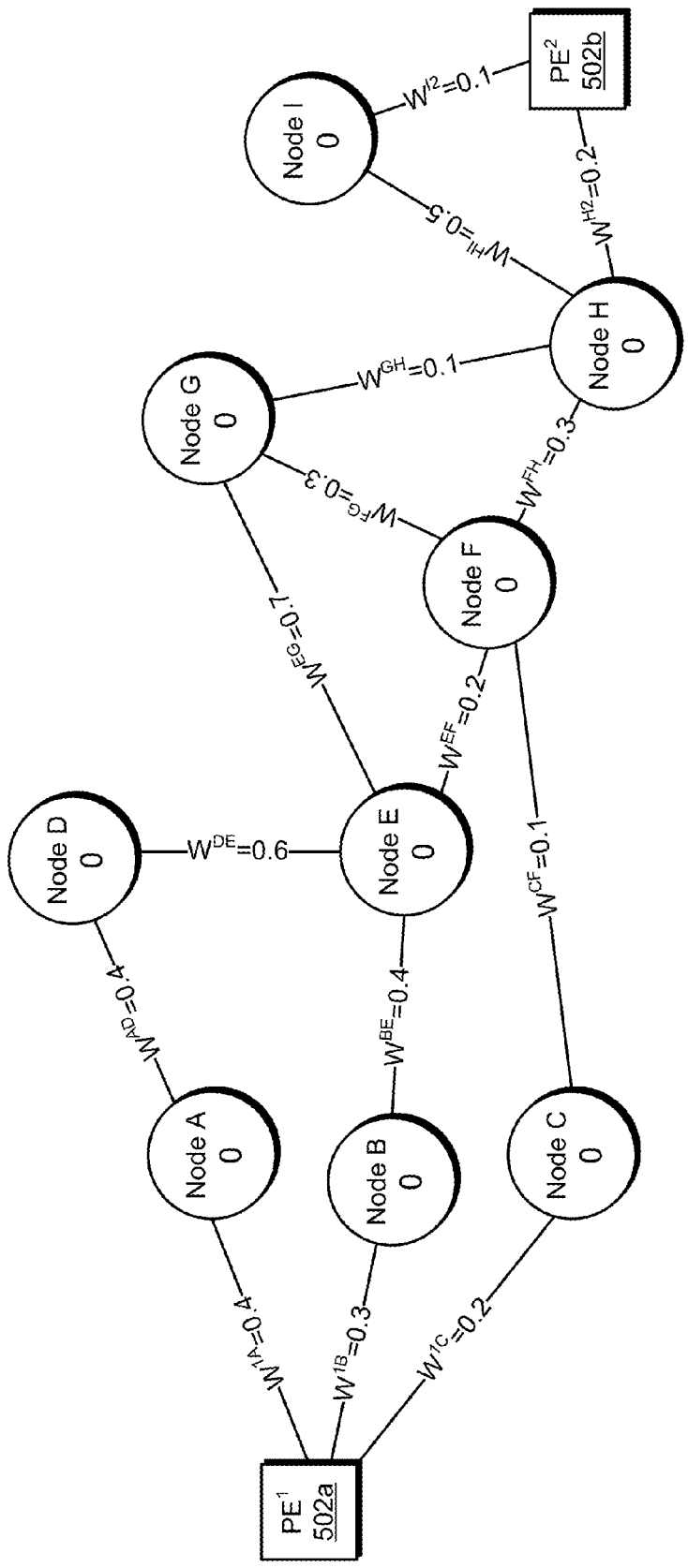
FIG. 6 is a network diagram depicting the Carrier Ethernet network of FIG. 5, where initial quality of service (QoS) penalty weights are assigned to network backhaul nodes and communication links in accordance with their respective QoS characteristics, in association with embodiments of the disclosure.

FIG. 6 depicts a diagram 600 with the Carrier Ethernet network 504 of FIG. 5, in a first stage in an EVC resiliency process, where initial quality of service (QoS) penalty weights are assigned to EVC nodes and EVC links in accordance with their respective QoS characteristics, represented by the following normalized QoS penalty equation:

$$QoS(i, j, k) = \alpha_k \times \frac{\text{Delay}(i, j)}{\text{MAX Delay}} + \beta_k \times \frac{\text{Jitter}(i, j)}{\text{MAX Jitter}} + \gamma_k \times \frac{\text{FLR}(i, j)}{\text{MAX FLR}} \quad (\text{Eq. 2})$$

where, MAX Delay, MAX Jitter, and MAX FLR are the max delay, max jitter, and max frame loss ratio, amongst all EVC links in the Carrier Ethernet network 504; Delay(i,j), Jitter(i,j), and FLR(i,j)=the delay, jitter, and frame loss ratio between two linked EVC nodes, i, j, in the Carrier Ethernet network 504; and $\alpha_k$, $\beta_k$, and $\gamma_k$ are factors of Ethernet service priority k in delay, jitter, and frame loss ratio, where $\alpha_k+\beta_k+\gamma_k=1$. In an embodiment, a service priority can be negotiated between a Carrier Ethernet service provider and a telecommunication service provider, and the priority can be denoted by a p bit value (e.g., in accordance with the IEEE 802.1p standard) in a VLAN tag of a corresponding Ethernet frame.

In an embodiment, the EVC nodes (Node A, Node B, Node C, Node D, Node E, Node F, Node G, Node H, and Node I) between $PE^1$ 502a and $PE^2$ 502b may be initialized to a default path penalty weight value of 0, and each EVC link between $PE^1$ 502a and $PE^2$ 502b may be initialized to a path penalty weight value corresponding to a current level of delay, jitter, and a frame loss ratio ($L^{1A}$=0.4, $L^{1B}$=0.3, $L^{1C}$=0.2 $L^{AD}$=0.4, $L^{BE}$=0.4, $L^{CF}$=0.1, $L^{DE}$=0.6, $L^{EG}$=0.7, $L^{EF}$=0.2, $L^{FG}$=0.3, $L^{FH}$=0.3, $L^{GH}$=0.1, $L^{HI}$=0.5, $L^{H2}$=0.2, and $L^{I2}$=0.1), in accordance with the QoS penalty Equation depicted above in Eq. 2. For example, each EVC link belong to the first alternative, shortest path would have its weight updated in accordance with its reuse penalty, as represented by the following equation:

$$QoS(i,j,k)+m \times p_n+n \times p_l \quad (\text{Eq. 3})$$

where, $p_n$ and $p_l$ are penalties per reused EVC node and EVC link, respectively; and m and n are the number of reused EVC nodes and EVC links, respectively. It should be understood that EVC nodes are more sensitive (e.g., susceptible to failure) than EVC links, which is why $p_n > p_l$.

Figure 7:
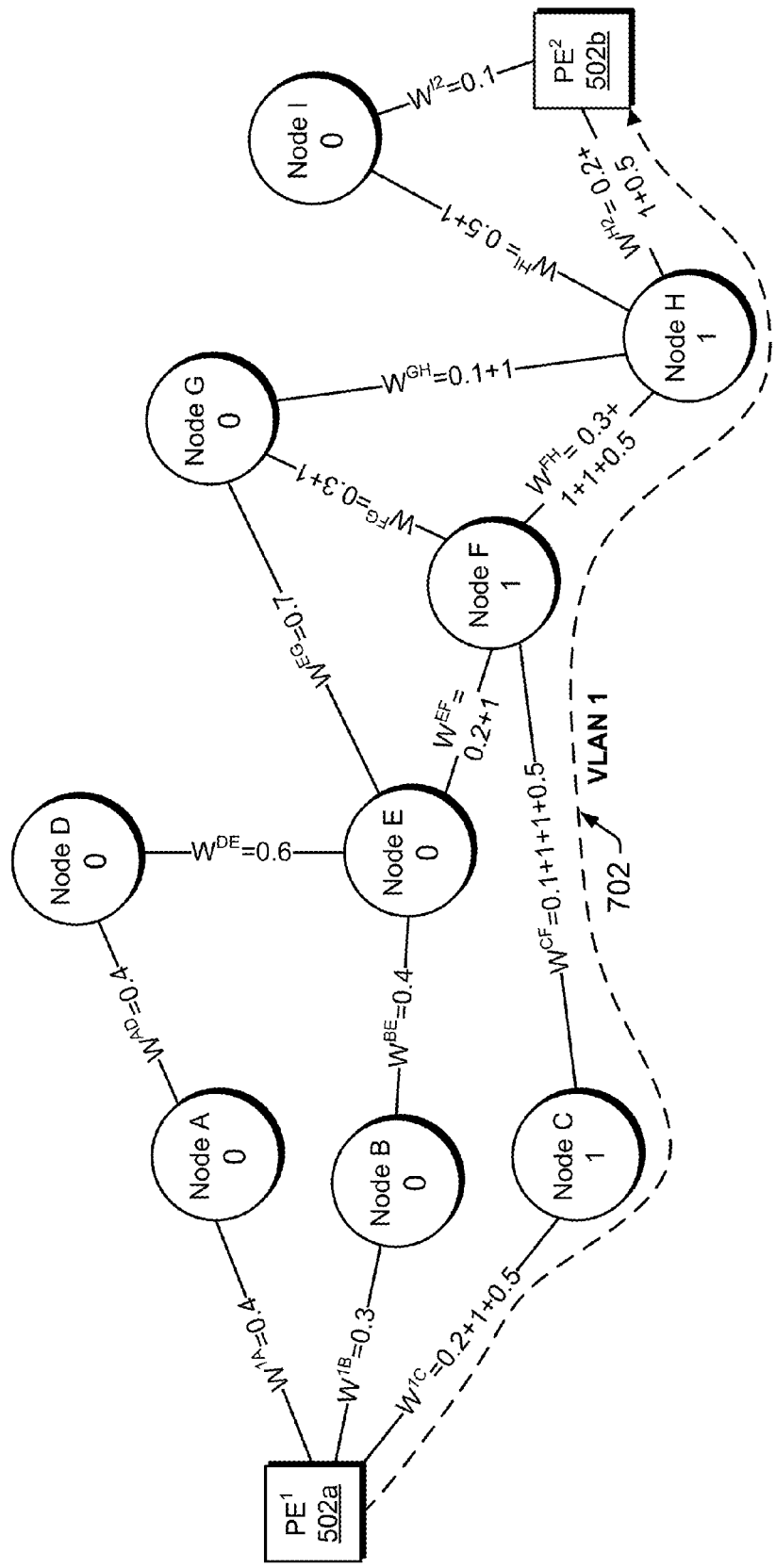
FIG. 7 is a network diagram depicting the Carrier Ethernet network of FIG. 6, where the network backhaul nodes and communication links are updated with a first VLAN path's QoS penalty weights, in accordance with embodiments of the disclosure.

FIG. 7 depicts a diagram 700 with the Carrier Ethernet network 504 of FIG. 6, in the second stage of an EVC resiliency process, where quality of service (QoS) penalty weights are assigned to EVC nodes and EVC links of a first shortest VLAN path 702. In an embodiment, the first shortest VLAN path 702 between $PE^1$ 502a and $PE^2$ 502b can be determined using Dijkstra's shortest-path algorithm. For each EVC node along the first VLAN path 702, a path penalty weight of 1 is added to each respective EVC node, and for each EVC link along the first VLAN path 702 the path penalty weight of 0.5 is added to each EVC link, along with the corresponding EVC node weights for EVC nodes joined by that EVC link of the first VLAN path 702.

Accordingly, Node C, Node F, and Node H are assessed a path penalty weight of 1, as each of these nodes is a component of the first VLAN path 702. Further, EVC link $L^{1C}$ is assessed an additional path penalty weight of 1.5, such that its updated link weight $W^{1C}$ has a value of 1.7, link $L^{CF}$ is assessed an additional path penalty weight of 2.5, such that its updated link weight $W^{CF}$ has a value of 2.6, link $L^{FH}$ is assessed an additional path penalty weight of 2.5, such that its updated link weight $W^{FH}$ has a value of 2.8, and link $L^{H2}$ is assessed an additional path penalty weight of 1.5, such that its updated link weight $W^{H2}$ has a value of 1.7.

Additionally, for each EVC link of the Carrier Ethernet network 504 that is not a component of the first VLAN path 702, but is instead connected to at least one EVC node of the first VLAN path 702, the corresponding EVC link's path penalty weight is increased by the weight value of the EVC node to which it is connected. Accordingly, link $L^{EF}$ is assessed an additional path penalty weight of 1 for being connected to Node F, which is a component of the first VLAN path 702, such that its updated link weight $W^{EF}$ has a value of 1.2, link $L^{FG}$ is assessed an additional path penalty weight of 1 for being connected to Node F, such that its updated link weight $W^{EF}$ has a value of 1.3, link $L^{GH}$ is assessed an additional path penalty weight of 1 for being connected to Node H, such that its updated link weight $W^{GH}$ has a value of 1.1, and link $L^{HI}$ is assessed an additional path penalty weight of 1 for being connected to Node H, such that its updated link weight $W^{HI}$ has a value of 1.5.

Figure 8:
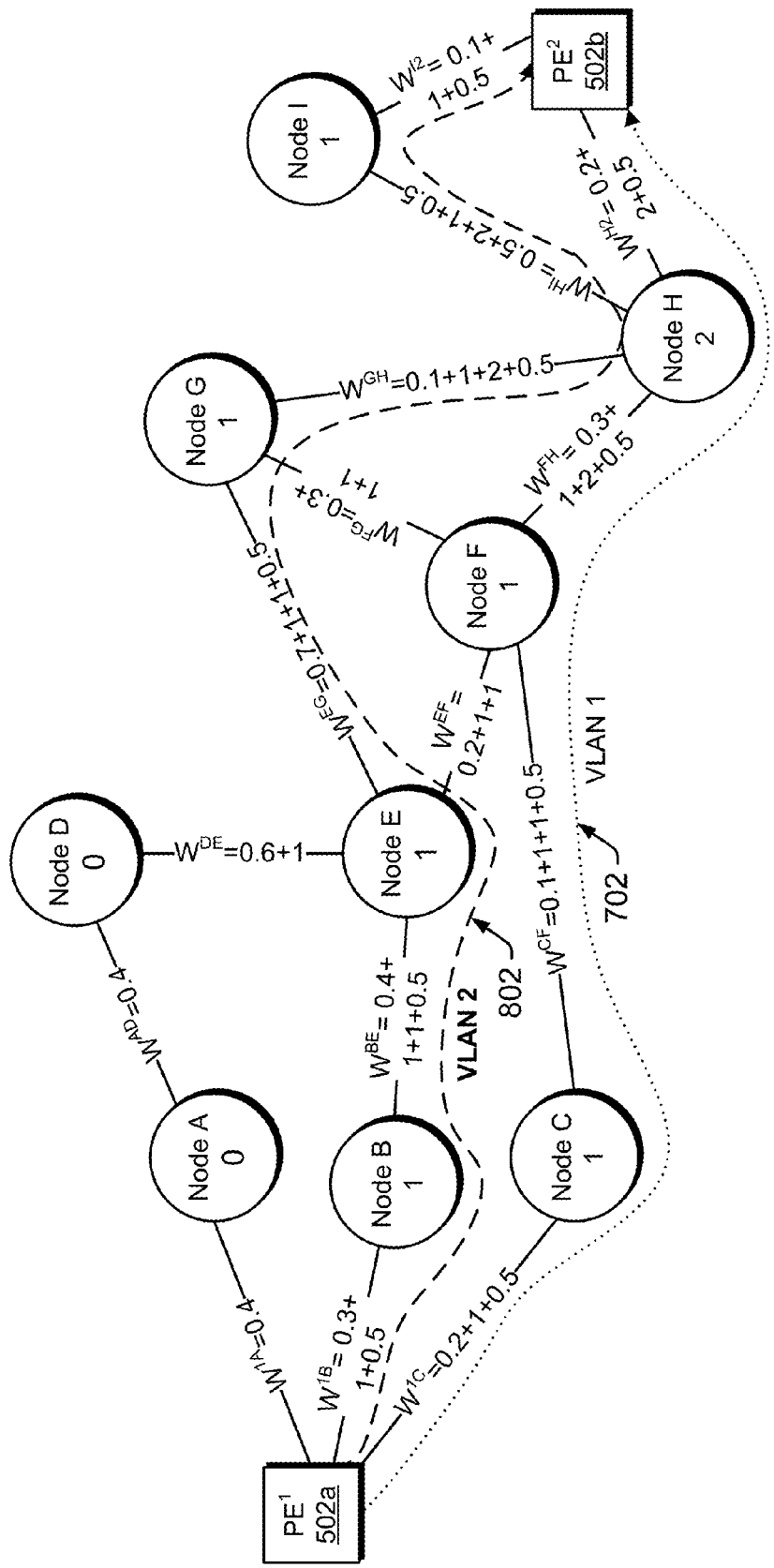
FIG. 8 a is network diagram depicting the Carrier Ethernet network of FIG. 7, where the network backhaul nodes and communication links are updated with a second VLAN path's QoS penalty weights, in accordance with embodiments of the disclosure.

FIG. 8 depicts a diagram 800 with the Carrier Ethernet network 504 of FIG. 7, in the third stage of an EVC resiliency process, where quality of service (QoS) penalty weights are again assigned to EVC nodes and EVC links of a second shortest VLAN path 802. In an embodiment, the second shortest VLAN path 802 between $PE^1$ 502a and $PE^2$ 502b can also be determined using Dijkstra's shortest-path algorithm. For each EVC node along the second VLAN path 802, the path penalty weight of 1 is added to each respective EVC node, and for each EVC link along the second VLAN path 802, the path penalty weight of 0.5 is added to each respective EVC link, along with the corresponding EVC node weights for each EVC node joined by that EVC link of the second VLAN path 802. Further, for any EVC link of the Carrier Ethernet network 504 that is joined to an EVC node of the second VLAN path 802, that EVC link will have its path penalty weight increased in accordance with the EVC node weight to which it is connected, as described above for FIG. 7.

Figure 9:
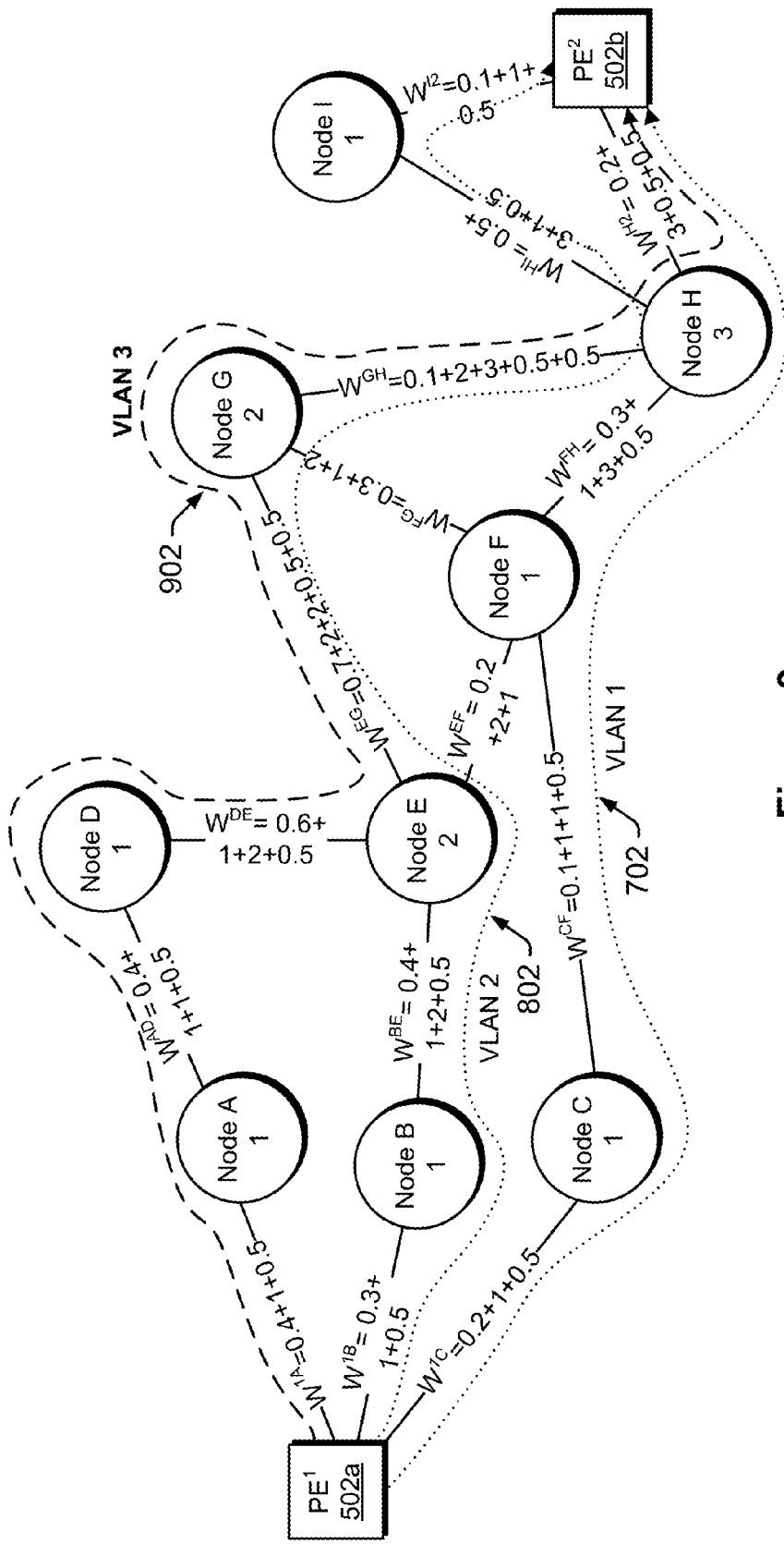
FIG. 9 is a network diagram depicting the Carrier Ethernet network of FIG. 8, where the network backhaul nodes and communication links are updated with a third VLAN path's QoS penalty weights, in accordance with embodiments of the disclosure.

FIG. 9 depicts a diagram 900 with the Carrier Ethernet network 504 of FIG. 8, in the fourth stage of an EVC resiliency process, where quality of service (QoS) penalty weights are again assigned to EVC nodes and EVC links of a third shortest VLAN path 902. In an embodiment, the third shortest VLAN path 902 between $PE^1$ 502a and $PE^2$ 502b can also be determined using Dijkstra's shortest-path algorithm. For each EVC node along the third VLAN path 902, the path penalty weight of 1 is added to each respective EVC node, and for each EVC link along the third VLAN path 902, the path penalty weight of 0.5 is added to each respective EVC link, along with the corresponding EVC node weights for each EVC node joined by that EVC link of the third VLAN path 902. Further, for any EVC link of the Carrier Ethernet network 504 that is joined to an EVC node of the third VLAN path 902, that EVC link will have its path penalty weight increased in accordance with the EVC node weight to which it is connected.

In accordance with various implementations, in a fifth stage of an EVC resiliency process, the updated EVC path weights for each of the first 702, second 802, and third 902 VLAN paths can be respectively summed and ranked (e.g., from low to high, starting with the alternative, shortest VLAN path having the lowest cumulative EVC path weight). As depicted in FIG. 9, the cumulative path weight of first VLAN path 702 is 18.1 (including both its EVC node and EVC link weights), the cumulative path weight of the second VLAN path 802 is 32.6 (including both its EVC node and EVC link weights), and the cumulative path weight of the third VLAN path 902 is 31.9 (including both its EVC node and EVC link weights). Accordingly, in this example it can be seen that the first VLAN path 702 has a much better cumulative path resiliency value/level, as compared to that of the second 802 and third 902 VLAN paths. In accordance with the above EVC algorithm, described with respect to FIGS. 6-9, both QoS and EVC path redundancy can be improved in a backhaul network by appropriately selecting an optimal EVC path (i.e., the first VLAN path 702 in the example scenario) for a particular uplink communication (a backhaul communication emanating from a user device) or for a particular downlink communication (a backhaul communication emanating from a service provider entity) of the Carrier Ethernet network 504.

In various implementations, it should be understood that a PE 402, or a pair of PEs 502a-b of a backhaul network may continually (e.g., on a periodic basis, in real-time) monitor each selected VLAN path 702, 802, and 902, for various QoS metric changes, such as those associated with one or more of: delay, jitter, FLR, throughput, congestion, QoS levels, CoS assignment, fault states, etc. When the PE(s) 502a-b detect that any of these QoS metrics are have substantially changed (e.g., to a value or level that exceeds a corresponding QoS threshold value), the corresponding EVC component weights assigned to the respective VLAN path's backhaul components may be updated in real-time.

Figure 10:
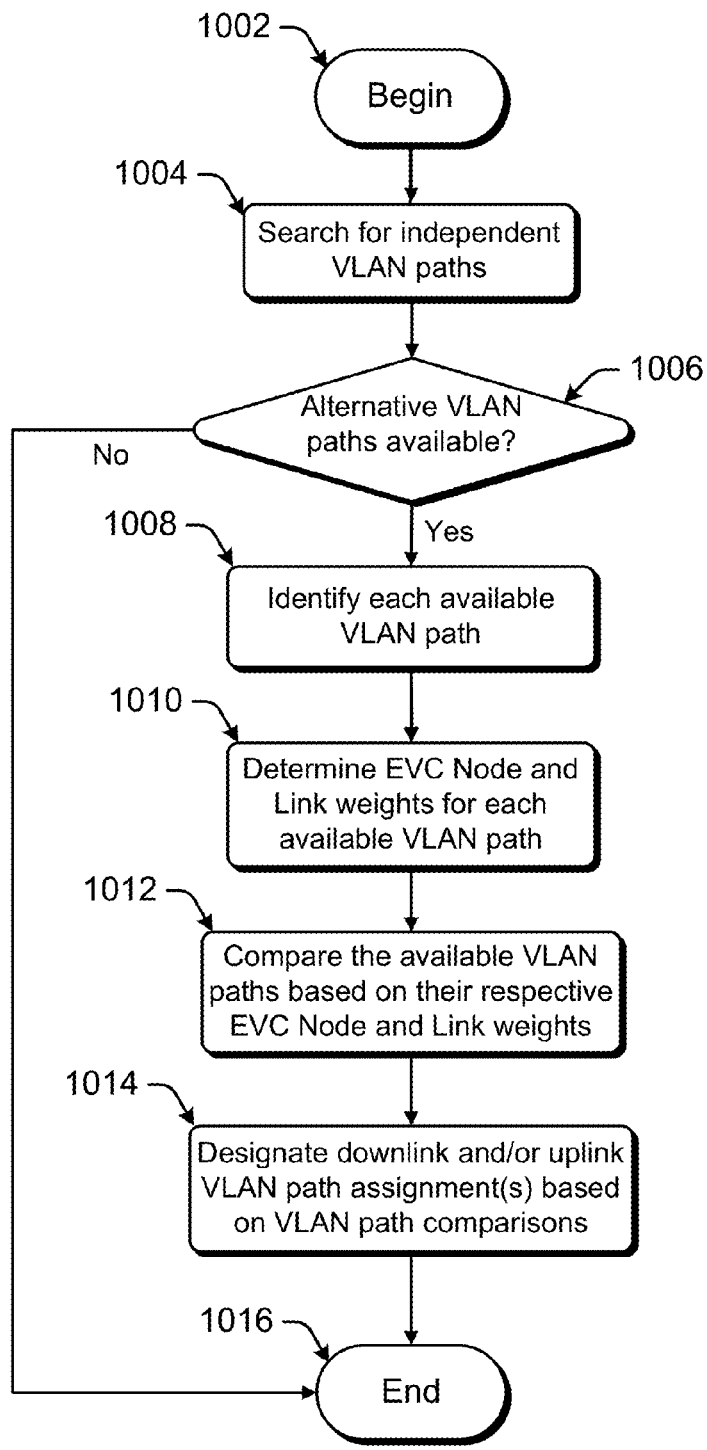
FIG. 10 is a flow diagram depicting an example process for identifying alternative VLAN paths and then selecting a preferred VLAN path by comparing the alternative VLAN paths based on their respective Ethernet Virtual Connection (EVC) node and link weights, in association with embodiments of the disclosure.

FIG. 10 is a flow diagram 1000 depicting an example process for identifying alternative VLAN paths (e.g., such as the first 702, second 802, and third 902 VLAN paths depicted in FIGS. 7-9), and then selecting a preferred VLAN path by comparing the alternative VLAN paths based on their respective EVC node and EVC link weights, in association with various implementations of the disclosure. It should be understood that these processes 1000 may be facilitated by the EVC resiliency component 416 of the PE device 402, depicted in FIG. 4. In various implementations, any of the flow diagram processes 1000 may alternatively be facilitated by a pair of communicating PE devices, $PE^1$ 502a and $PE^2$ 502b, which are located on opposing sides of a Carrier Ethernet network 504, as depicted in any of FIGS. 5-9.

In an embodiment, the flow diagram process 1000 begins at block 1002, after a PE 502a-b (e.g., a UNI or a NNI) receives an uplink or downlink backhaul communication for transmittal over a Carrier Ethernet portion 504 of the telecommunication network. Then the process proceeds to block 1004, where a PE 502a-b searches for independent VLAN paths between a source PE 502a and a destination PE 502b (e.g., by using the alternative path identification module 418, which references the PE profile and backhaul component storage 412 for backhaul component ID information that is associated with each available VLAN path). Next, at decision block 1006 it is determined whether multiple, alternative VLAN paths are available. In a scenario where it is determined that no alternative VLAN paths are available for a particular backhaul communication, at decision block 1006, the process ends at block 1016.

However, when it is determined that one or more alternative VLAN paths are available for a particular backhaul communication, at decision block 1006, then the process proceeds to block 1008, where each available alternative VLAN path is identified and optionally ranked accordingly to its respective path length (e.g., which may be determined using Dijkstra's shortest-path algorithm, as described above). Subsequently, the process proceeds to block 1010 where corresponding EVC node and EVC link weights are determined for each alternative, shortest VLAN path (e.g., such as by employing the EVC path algorithm described above with respect to FIGS. 5-9, where the EVC resiliency component 416 consults a set of corresponding EVC node and link weighting rules 414 to determine EVC component weights along a particular VLAN path).

Next, the process proceeds to block 1012, where the alternative, shortest VLAN paths are compared with each other based on their respective EVC node and EVC link weights, as defined by a cumulative EVC path weight for each respective VLAN path (e.g., using the path comparison module 418 of the PE's 402 EVC resiliency component 416). Then, either an uplink or a downlink EVC path is assigned for a backhaul communication (e.g., via the uplink and downlink path assignment module 418 of the EVC resiliency component 416), based on the corresponding path comparisons, described above. Subsequently, the process ends at block 1016, after a related uplink or downlink backhaul communication has been allocated to a resilient VLAN path.

FIG. 11 is a flow diagram 1100 depicting an example process for comparing alternative communication paths for a communication over the backhaul portion of a telecommunication network (e.g., over the Carrier Ethernet 504 network), based on levels of backhaul component reuse, in association with various embodiments of the disclosure. It should be understood that these processes 1100 may be facilitated by the EVC resiliency component 416 of FIG. 4. In various implementations, any of the flow diagram processes 1100 may alternatively be facilitated by a pair of communicating PE devices, $PE^1$ 502a and $PE^2$ 502b, which may be located on opposing sides of a Carrier Ethernet network 504, as depicted in any of FIGS. 5-9.

In an embodiment, the flow diagram process 1100 begins at block 1102, and then proceeds to block 1104 where a PE 502a-b (e.g., a UNI or a NNI) receives a backhaul communication for a remote device via a backhaul portion of the telecommunication network. Then the process proceeds to block 1006, where a PE 502*a-b* determines multiple alternative communication paths between a source PE 502*a* and a destination PE 502*b* (e.g., by using the alternative path identification module 418 to consult the PE profile and backhaul component storage 412 for backhaul component ID information associated with available communication paths).

Next, at block 1108, determined alternative communication paths are compared with each other based on their corresponding levels of backhaul component reuse (e.g., using the path comparison module 418 of the PE's 402 EVC resiliency component 416, where the backhaul component reuse is described in association with the above processes of discussed in conjunction with FIGS. 6-9). Then at decision block 1110, the alternative communication paths are optionally compared with each other based on any one or more of: path throughput, path availability, path congestion, cumulative path QoS, CoS assignment, historical traffic trends, backhaul fault state information, etc. (e.g., using the path comparison module 418 of the PE's 402 EVC resiliency component 416).

Subsequently, the process proceeds to block 1112, where an alternative communication path having minimal backhaul component reuse (e.g., a communication path is determined to have a cumulative path penalty weight that is lower than a majority of the cumulative path penalty weights associated the remainder of the alternative communication paths) is identified (e.g., by the alternative path identification and path comparison module 418 of the EVC resiliency component 416). Then, the identified communication path for either an uplink or a downlink communication is selected to facilitate the corresponding backhaul communication (e.g., via the uplink and downlink path assignment module 418 of the PE's 402 EVC resiliency component 416). Subsequently the process ends at block 1116, after the communication path selection.

FIG. 12 is a flow diagram 1200 depicting an example process for comparing alternative Carrier Ethernet paths for an uplink or a downlink communication, based on Carrier Ethernet path component reuse values, in association with various implementations of the disclosure. It should be understood that these processes 1200 may be facilitated, at least in part, by the EVC resiliency component 416 of the PE device 402. Further, in various other embodiments, any of the flow diagram processes 1200 may be facilitated by a pair of communicating PE devices, PE$^1$ 502*a* and PE$^2$ 502*b*, which can be located on opposing sides of a Carrier Ethernet network 504, as depicted in any of FIGS. 5-9.

In an embodiment, the flow diagram process 1200 begins at block 1202, after a PE 502*a-b* (e.g., a UNI or an NNI) receives an uplink or downlink backhaul communication for transmittal over a Carrier Ethernet portion 504 of the telecommunication network. Then the process proceeds to block 1204, where a PE 502*a-b* determines alternative Carrier Ethernet paths for an uplink or a downlink Carrier Ethernet communication between a source PE 502*a* and a destination PE 502*b* (e.g., by using the alternative path identification module 418). Next, at block 1206, determined alternative Carrier Ethernet paths are compared with each other based on their corresponding Carrier Ethernet component reuse values (e.g., using the path comparison module 418 of the EVC resiliency component 416, where Carrier Ethernet component reuse values are described in association with the above processes of FIGS. 6-9). Then at decision block 1208 the alternative Carrier Ethernet paths are optionally compared with each other based on any one or more of: path throughput, path congestion, cumulative path QoS, CoS assignment, historical traffic trends, backhaul fault state information, etc. (e.g., using the path comparison module 418).

Subsequently, the process proceeds to block 1210, where a Carrier Ethernet path having a Carrier Ethernet component reuse value that is lower than that of a majority of the alternative Carrier Ethernet paths (e.g., a Carrier Ethernet path that is determined to have a cumulative path penalty weight value that is lower than a select, provider-specified portion of the cumulative path penalty weight values associated the remainder of the alternative Carrier Ethernet paths) is identified (e.g., by the alternative path identification and path comparison module 418). Next, at block 1212, the identified Carrier Ethernet path for either an uplink or a downlink Carrier Ethernet communication is selected to facilitate the corresponding Carrier Ethernet communication (e.g., via the uplink and downlink path assignment module 418). Subsequently, the process ends at block 1214, after the Carrier Ethernet path selection is complete.

It should be understood that although the present disclosure describes several examples and related embodiments, the disclosure is not intended to be all-inclusive nor exhaustive in its descriptions. As such, it should be appreciated that the related subject matter of the disclosure can be reasonably modified, rearranged, or otherwise altered, to achieve similar results, without departing from the spirit and scope of the invention, as claimed.

What is claimed is:

1. A network device comprising:
one or more network interfaces;
one or more processors; and
a memory coupled to the one or more processors and storing a backhaul resiliency module,
wherein the backhaul resiliency module is configured to be operated by the one or more processors to:
determine a plurality of alternative communication paths of a backhaul portion of a telecommunication network, each of the plurality of alternative communication paths comprising a unique combination of backhaul components that is different from that of a remainder of the plurality of alternative communication paths, each unique combination of backhaul components corresponding to a unique combination of Carrier Ethernet nodes and communication links that connect pairs of Carrier Ethernet nodes;
determine a level of backhaul component reuse for each of the plurality of alternative communication paths by assigning path penalty weights to corresponding backhaul components for each of the plurality of alternative communication paths;
compare the plurality of alternative communication paths to identify at least one communication path of the plurality of alternative communication paths based on the level of backhaul component reuse among multiple alternative communication paths; and
select the at least one identified communication path for an uplink communication emanating from a user device or for a downlink communication emanating from a service provider,
wherein the path penalty weights are assigned to every Carrier Ethernet node and communication link of a corresponding alternative communication path, such that the level of backhaul component reuse for each of the plurality of alternative communication paths is indicated by summing the path penalty weights assigned to the Carrier Ethernet nodes and communication links of the corresponding alternative communication path.

2. The network device of claim 1, wherein the determination of the plurality of alternative communication paths further comprises the network device communicating with a remote network device via the backhaul portion of the telecommunication network to detect all currently available communication paths for a backhaul communication.

3. The network device of claim 1, wherein the backhaul resiliency module is further configured to be operated by the one or more processors to compare the plurality of alternative communication paths based on one or more of: path throughput, path availability, path reliability, path congestion, quality of service (QoS), class of service (CoS) assignment, and historical network traffic.

4. The network device of claim 1, wherein the at least one identified communication path corresponds to a communication path of the plurality of alternative communication paths having a minimum number of backhaul components in common with a remainder of the plurality of alternative communication paths.

5. A method comprising:
    determining a plurality of alternative paths of a Carrier Ethernet network, wherein each of the plurality of alternative paths corresponds to a unique combination of backhaul components that is different from that of a remainder of the plurality of alternative communication paths, each unique combination of backhaul components corresponding to a unique combination of Carrier Ethernet nodes and communication links that connect pairs of Carrier Ethernet nodes;
    determining a level of backhaul component reuse for each of the plurality of alternative communication paths by assigning path penalty weights to corresponding backhaul components for each of the plurality of alternative communication paths;
    comparing the plurality of alternative paths based on their respective levels of backhaul component reuse;
    identifying at least one path of the plurality of alternative paths based on the comparing; and
    determining the at least one identified path to correspond to a predetermined quality of service (QoS) level,
    wherein the path penalty weights are assigned to every Carrier Ethernet node and communication link of a corresponding alternative communication path, such that the level of backhaul component reuse for each of the plurality of alternative communication paths is indicated by summing the path penalty weights assigned to the Carrier Ethernet nodes and communication links of the corresponding alternative communication path.

6. The method of claim 5, further comprising selecting the at least one identified path for an uplink communication or a downlink communication of the Carrier Ethernet network.

7. The method of claim 5, wherein the act of determining the plurality of alternative paths of a Carrier Ethernet network further comprises:
    receiving a communication from a remote device via the Carrier Ethernet network; and
    detecting all currently available paths for a communication of the Carrier Ethernet network based on the received communication.

8. The method of claim 5, further comprising comparing the plurality of alternative paths based on one or more of: path throughput, path availability, path reliability, path congestion, quality of service (QoS), class of service (CoS) assignment, and historical network traffic.

9. The method of claim 5, wherein the at least one identified path corresponds to a path of the plurality of alternative paths having a minimum number of Carrier Ethernet components in common with a remainder of the plurality of alternative paths.

10. A computer storage device with a stored computer-executable program, which when executed by one or more processors, performs a method, comprising:
    determining a plurality of alternative paths of a Carrier Ethernet network, wherein each of the plurality of alternative paths corresponds to a unique combination of backhaul components that is different from that of a remainder of the plurality of alternative communication paths, each unique combination of backhaul components corresponding to a unique combination of Carrier Ethernet nodes and communication links that connect pairs of Carrier Ethernet nodes;
    determining a level of backhaul component reuse for each of the plurality of alternative communication paths by assigning path penalty weights to corresponding backhaul components for each of the plurality of alternative communication paths;
    comparing the plurality of alternative paths based on their respective levels of backhaul component reuse;
    identifying at least one path of the plurality of alternative paths based on the comparing; and
    determining the at least one identified path to correspond to a predetermined quality of service (QoS) level,
    wherein the path penalty weights are assigned to every Carrier Ethernet node and communication link of a corresponding alternative communication path, such that the level of backhaul component reuse for each of the plurality of alternative communication paths is indicated by summing the path penalty weights assigned to the Carrier Ethernet nodes and communication links of the corresponding alternative communication path.

11. The computer storage device of claim 10, the method further comprising selecting the at least one identified path for an uplink communication or a downlink communication of the Carrier Ethernet network.

12. The computer storage device of claim 10, wherein the act of determining the plurality of alternative paths of a Carrier Ethernet network further comprises:
    receiving a communication from a remote device via the Carrier Ethernet network; and
    detecting all currently available paths for a communication of the Carrier Ethernet network based on the received communication.

13. The computer storage device of claim 10, the method further comprising comparing the plurality of alternative paths based on one or more of: path throughput, path availability, path reliability, path congestion, quality of service (QoS), class of service (CoS) assignment, and historical network traffic.

14. The computer storage device of claim 10, wherein the at least one identified path corresponds to a path of the plurality of alternative paths having a minimum number of Carrier Ethernet components in common with a remainder of the plurality of alternative paths.

* * * * *